United States Patent [19]

Fitch et al.

[11] Patent Number: 5,526,521
[45] Date of Patent: Jun. 11, 1996

[54] METHOD AND SYSTEM FOR PROCESS SCHEDULING FROM WITHIN A CURRENT CONTEXT AND SWITCHING CONTEXTS ONLY WHEN THE NEXT SCHEDULED CONTEXT IS DIFFERENT

[75] Inventors: Blake G. Fitch, New Rochelle; Mark E. Giampapa, Irvington, both of N.Y.

[73] Assignee: International Business Machines Corporation

[21] Appl. No.: 378,067

[22] Filed: Jan. 25, 1995

Related U.S. Application Data

[63] Continuation of Ser. No. 21,918, Feb. 24, 1993, abandoned.
[51] Int. Cl.⁶ ............................... G06F 9/44; G06F 9/46
[52] U.S. Cl. .................... 395/650; 364/DIG. 1; 364/230; 364/230.1; 364/230.3; 364/231.4; 364/231.6
[58] Field of Search ............................................ 395/650

[56] References Cited

U.S. PATENT DOCUMENTS

| | | | |
|---|---|---|---|
| 4,047,161 | 9/1977 | Davis | 364/200 |
| 4,445,173 | 4/1984 | Pilat et al. | 364/200 |
| 4,484,274 | 11/1984 | Berenbaum et al. | 364/200 |
| 4,562,538 | 12/1985 | Berenbaum et al. | 364/200 |
| 4,658,351 | 4/1987 | Teng | 395/650 |
| 4,930,065 | 5/1990 | McLagan et al. | 364/200 |
| 4,964,040 | 10/1990 | Wilcox | 364/200 |
| 5,008,812 | 4/1991 | Bhandarkar et al. | 364/200 |
| 5,016,166 | 5/1991 | Van Loo et al. | 364/200 |
| 5,127,098 | 6/1992 | Rosenthal et al. | 395/650 |
| 5,161,226 | 11/1992 | Wainer | 395/650 |
| 5,179,702 | 1/1993 | Spix et al. | 395/650 |
| 5,245,702 | 9/1993 | McIntyre et al. | 395/164 |
| 5,247,675 | 9/1993 | Farrell et al. | 395/650 |

OTHER PUBLICATIONS

Tannenbaum, Andrew S., *Modern Operating Systems*, Prentice Hall, pp. 61–70, 300–303 & 647–649, 1992.
Stone, H. S., "Technique for Reducing the Number of REgisters Saved at a Context Swap", IBM Technical Disclosure Bulletin, vol. 33, No. 3A, pp. 234–235, Aug., 1990.
Beetcher et al. "Deterministic Context Swtiching of Registers", IBM Disclosure Bulletin, vol. 32, No. 6B, pp. 70–73, Nov. 1989.

*Primary Examiner*—Alvin E. Oberley
*Assistant Examiner*—St. John Courtenay, III
*Attorney, Agent, or Firm*—Heslin & Rothenberg

[57] ABSTRACT

Method and system for managing process scheduling among multiple control contexts within a data processing environment. A given control context, comprising one of multiple control contexts, is assumed to be executing at a processing node within the environment. The approach includes processing a scheduling event; evaluating process scheduling from within the executing control context to determine a restart control context, which also comprises one of the multiple control contexts; and restarting executing data within the restart control context in response to the process scheduling occurring within the given control context. Context switching is employed only if process scheduling determines that the restart control context is other than the given control context. The technique is particularly useful in nonpreemptive parallel data processing environments.

16 Claims, 3 Drawing Sheets

METHOD AND SYSTEM FOR PROCESS SCHEDULING FROM WITHIN A CURRENT CONTEXT AND SWITCHING CONTEXTS ONLY WHEN THE NEXT SCHEDULED CONTEXT IS DIFFERENT

This application is a continuation, of application Ser. No. 08/021,918, filed Feb. 24, 1993, now abandoned.

TECHNICAL FIELD

The present invention relates in general to data processing environments, and in particular, to such environments wherein context switching is employed to facilitate multithread processing of an application program.

BACKGROUND ART

Increasingly, programs are written to execute using arrays of standard processors in parallel. Software supervisor systems are then written to enable an application programmer to harness these processors and orchestrate the efficient cooperation of each processing unit in achieving overall programming goals. Such a software supervisor is referred to in the art as a parallel "microkernel". Taken as a collective, these microkernels create an application program environment similar to that created by any monolithic kernel or operating system.

Parallel microkernels are similar to monolithic kernels in that they manage the resources of the machine environment around them. There is, however, a significant difference between parallel and monolithic kernels. In particular, monolithic kernels seek to fairly divide a machine environment among competitive task contexts over time. A parallel microkernel, on the other hand, is generally written to efficiently direct the capabilities of each machine environment in achieving a single goal, i.e., the efficient completion of the individual kernel's portion of the parallel application. Within a parallel microkernel, the component tasks are never really competitive since they are working within one application program toward a single goal.

Central to any kernel's duties is the scheduling and descheduling of control contexts. Control contexts are given different names such as "threads," "processes," or "tasks" depending upon the properties of the context and the naming conventions of the kernel. A context is left in control of a machine environment until it either yields, is blocked waiting for something, or is interrupted. These are called descheduling events since it is at that time that scheduling algorithms are evaluated for priority of context execution. In nonpreemptive scheduling, user contexts are never switched as a result of an interrupt. All processor interrupts eventually return to the context processing at the time of the interruption.

In a nonpreemptive parallel microkernel, an application programmer controls context scheduling. This is done either indirectly, by programming in a single threaded model, or directly, by yielding between multiple context. In the former case, there is only a single application context per machine environment and thus from the programmer's perspective, it should always be scheduled when ready to run. In the later case, the programmer will specifically yield or make a blocking kernel call to control the scheduling of participating user contexts. In both cases, a call to a microkernel service may block the running context and cause an evaluation of the scheduling algorithm(s). In either case, a context switch is often redundant. This is because the microkernel, after evaluating the scheduling algorithm(s) often determines that the priority context is exactly the context that has yielded or blocked.

Therein lies the problem. In standard kernel context scheduling, a complete context switch is performed whenever there is occasion to reevaluate the scheduling algorithm. The assumption is that there is a high likelihood that the next context given priority will be other than the context which has yielded or blocked. In a parallel microkernel environment this is a bad assumption. In fact, there is a high probability that there will be a redundant context switch as a context finds itself continuously rescheduled to execute. Thus, a need exists in the data processing art for a scheduling method which does not incur the heavy overhead of a context switch when evaluation of the scheduling algorithm will probably show it to be redundant.

DISCLOSURE OF THE INVENTION

Briefly summarized, the present invention comprises in one aspect a method for managing process scheduling among at least two control contexts at a processing node of a data processing environment.

The method includes the steps of: executing in the data processing system within a given control context comprising one of the at least two control contexts; upon processing a scheduling event, evaluating process scheduling priority while executing from within the given control context; and restarting execution within a restart control context comprising one of the at least two control contexts, the restart control context being determined by the process scheduling evaluating step. In an enhanced embodiment, the data processing system comprises a non-preemptive, parallel data processing system.

In another aspect, a system for managing process scheduling among a plurality of control contexts at a processing node is provided. A given control context, which comprises one of a plurality of control contexts, is assumed to be executing at the processing node. The managing system includes processing means for identifying a context scheduling event. Upon identifying a context scheduling event, a context scheduler is evaluated from within the given control context to identify a restart control context for the processing node. The restart control context comprises one of the plurality of control contexts and has scheduling priority over any other control context of the plurality of control contexts ready to run. Execution restarting means is also provided for restarting execution of data at the processing node within the restart control context identified by the schedule evaluating means.

To summarize, a novel technique for managing process scheduling among multiple control contexts within a data processing environment is presented. This technique involves dividing the process scheduling function into separate portions. First, an evaluation function from within the processing control context is employed to determine whether a context switch is warranted. Secondly, if a context switch is warranted, then a context switcher is called to save the state of the descheduling control context, and restore the state of the priority control context. This second function may be executed either in the descheduling context or as a privileged context. The management technique is most useful in a situation where a single computer node is consumed by a single program which provides nonpreemptive process scheduling. The scheduling mechanism is useful in any situation where it is likely that redundant context switches will be invoked, thereby resulting in performance overhead. The concepts can be readily extended to preemptive process scheduling as well.

BRIEF DESCRIPTION OF DRAWINGS

These and other objects, advantages and features of the present invention will be more readily understood from the following detailed description of certain preferred embodiments of the present invention, when considered in conjunction with the accompanying drawings in which.

BEST MODE FOR CARRYING OUT THE INVENTION

Figure 1:
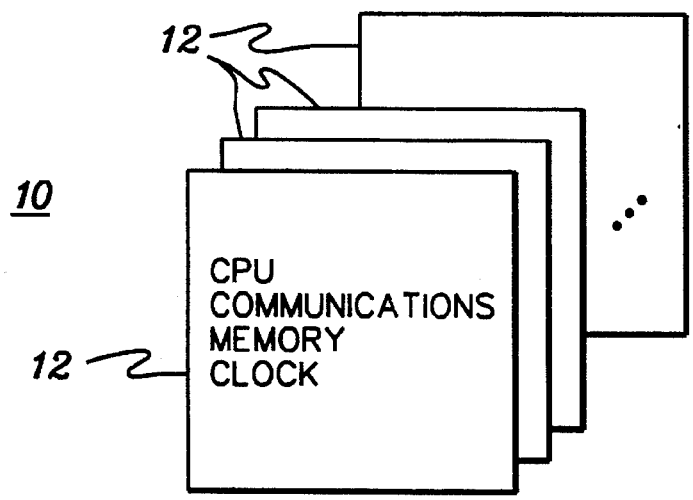
FIG. 1 generally represents one embodiment of a parallel data processing environment to incorporate the present invention.

FIG. 1 is a simplified embodiment of a parallel data processing environment, generally denoted 10, having an array of processing nodes 12. Each processing node 12 may be implemented in hardware, a combination of hardware and software, or principally software (e.g., a virtual processing node). Taken together, processing nodes 12 provide a machine environment within which data processing functions are executed. In one standard embodiment, each processing node 12 includes a CPU, a communications interface, memory and a clocking mechanism.

Figure 2:
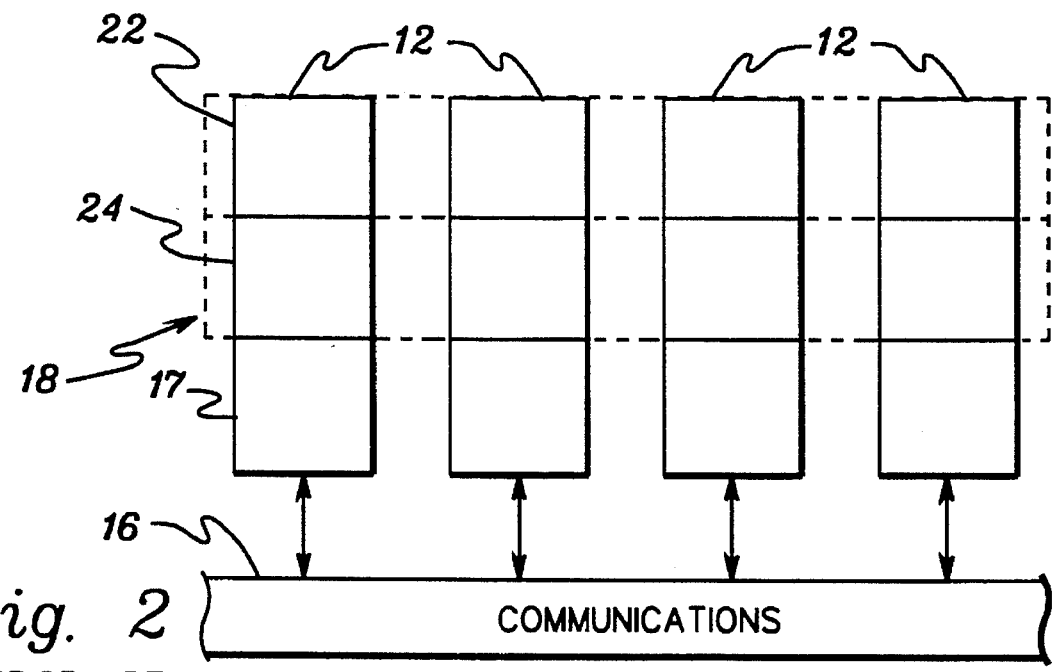
FIG. 2 is a representation of several processing nodes, interconnected through a communications interface, in a parallel data processing environment to incorporate the present invention.

Within an array of processing nodes, the nodes typically communicate via high priority messages and low priority messages. By way of example, four processing nodes 12 (or processing stacks) are shown in FIG. 2 to be coupled to a communications interface 16 for bi-directional transfer of data therebetween.

In this embodiment, each processing node 12 includes a software component 18 and a hardware component 17, which together form a processing stack. Software 18 includes an application program 22 and a control system or kernel 24. Each control system or kernel 24 inherently understands that it is part of a larger system, i.e., a parallel data processing environment. The kernels control the flow of information between processing nodes 12.

Figure 3:
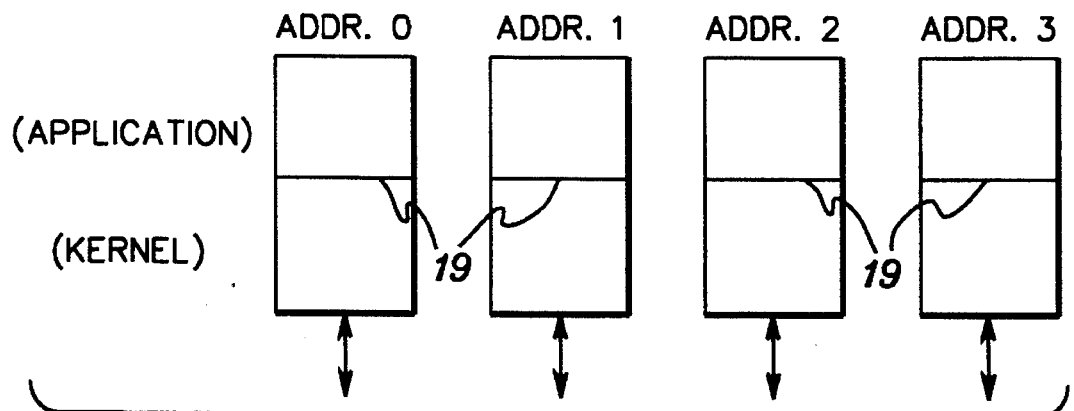
FIG. 3 depicts one embodiment of address space assignment for the parallel processing nodes of FIG. 2.

As shown in FIG. 3, every processing node 12 in the parallel data processing environment has a single address space "ADDR. 0", "ADDR. 1", "ADDR. 2" and "ADDR. 3" associated therewith; i.e., the complete address space is multi-threaded. Each kernel/application interface 19 makes available to its processing node the same global functions as those available at all other processing nodes. The execution within a given address space can either affect that address space or produce an equivalent effect in an address space of an object named within the data, i.e., through the communications interface 16 (FIG. 2). The context scheduling management method/system discussed below seeks to enhance processing performance within a single address space of the parallel data processing environment. (The invention also extends to enhancing performance of a single processor assigned to process multiple threads of an application program.)

Operating systems divide the machine environment managed by an operating system among different control contexts (i.e., different processes and/or threads) over time. When a scheduling event is reached, the conventional approach has been to perform the following three steps in the order presented: (1) deschedule the currently running context by saving the parameters of the current context; (2) using scheduling code within the operating system to determine the next context to be run (which generally requires the loading of an operating system context); and (3) scheduling the new context (i.e., by loading the parameters of the new context at the processing node).

In contrast to this approach and in accordance with the present invention, the scheduling code is first evaluated from within the current context, and the current context is only descheduled if a determination is made (by running the scheduling code) that a context switch is to occur. In essence, the present invention is to divide the scheduling function into an evaluation stage, which again is accomplished from within the current control context, and a conditional context switching stage. In one embodiment, the scheduling code can be executable from within a currently running context by providing the code (i.e., the program routines which must run to determine which context has priority) in a subroutine library readable by any control context and executable from within the currently running process at any rescheduling point, for example, via a subroutine call or via an interrupt. (While a few parameters are necessarily saved upon a subroutine call or interrupt, a much more significant number of parameters must be saved whenever a process or thread context is switched.)

A context switch is performed by a conventional "context switcher" function, which typically entails saving the entire state of a descheduled context, updating kernel scheduling structures, and then restoring an entire state of an incoming control context. A context switcher may have no control context of its own, e.g., by using the descheduling context to execute, or it may be executed from a privileged context entered by a supervisor call.

One embodiment of a method/system for managing context scheduling pursuant to the present invention is presented in FIGS. 4a & 4b and described below in connection with a nonpreemptive scheduling environment. However, the invention is readily generalized to encompass preemptive scheduling as long as data structures used in the scheduling code may be accessed (i.e., read) from within the contexts being scheduled.

Figure 4A:
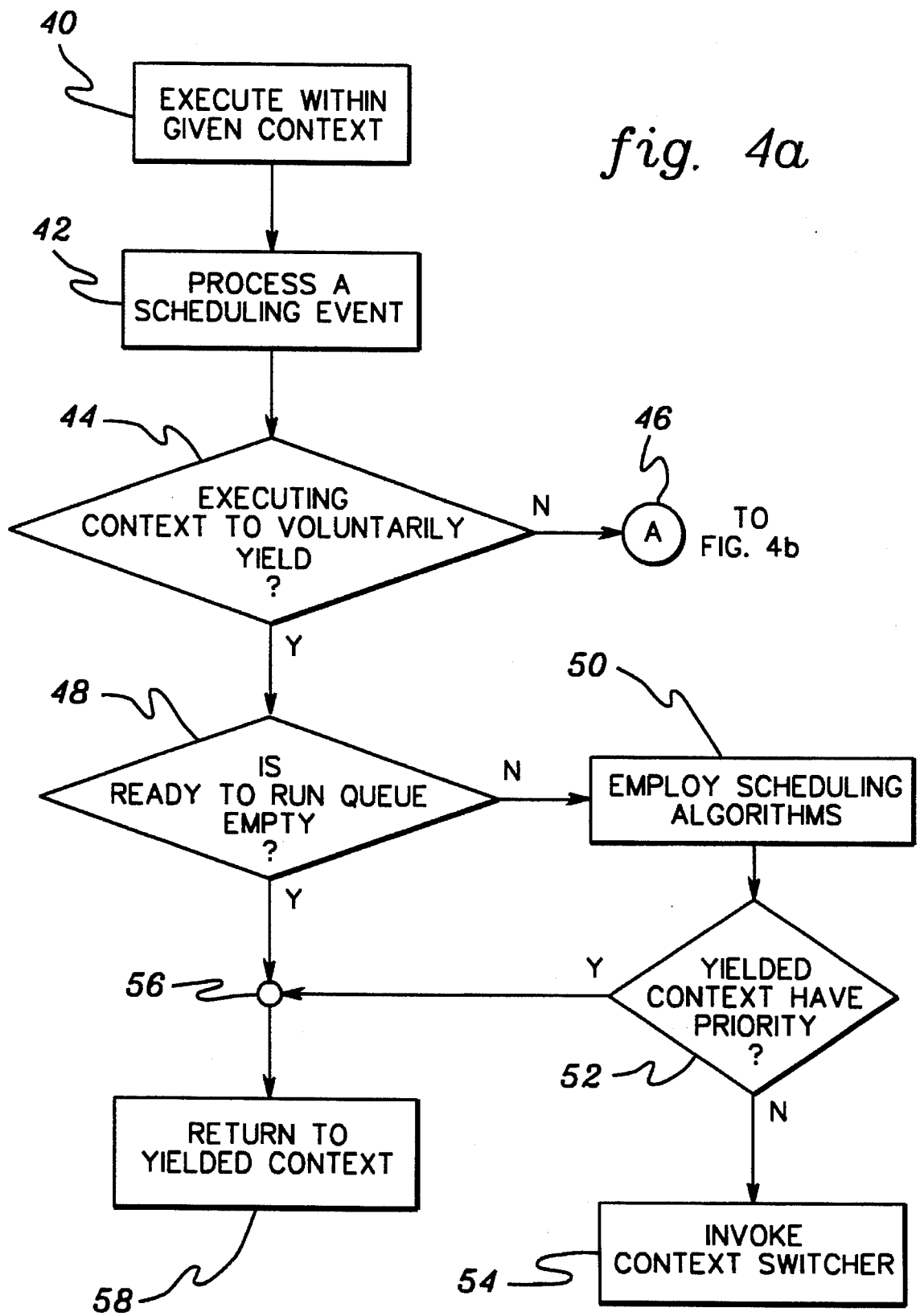
FIGS. 4a & 4b are flowcharts of one embodiment of a method for managing context scheduling pursuant to the present invention.
Figure 4B:
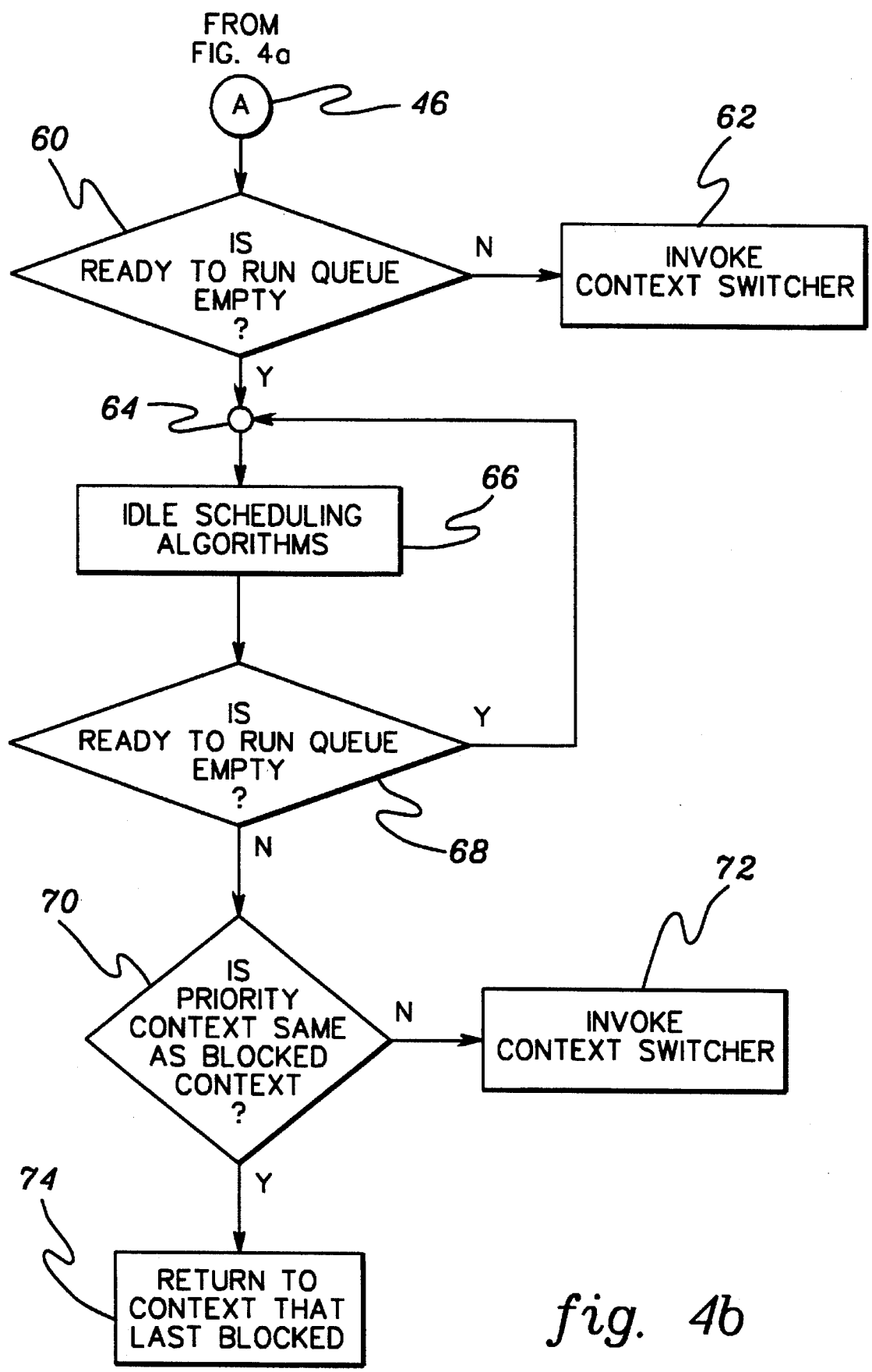

At a processing node, processing is begun by executing one of a number of control contexts, 40 "Execute Within Given Context." A scheduling event is processed, 42 "Process A Scheduling Event," after which an initial inquiry is made into whether the executing context is voluntarily yielding, 44 "Executing Context To Voluntarily Yield?" If not, then the running control context is blocked waiting on an event and processing passes via junction "A" 46 to the control sequence of FIG. 4b.

Continuing with FIG. 4a, and assuming that the executing control context is voluntarily yielding, inquiry is next made into whether an associated ready to run queue is empty, 48 "Is Ready To Run Queue Empty?" Whenever the executing control context is voluntarily yielding, it is actually capable of continuing execution as soon as its priority over other ready to run control contexts is confirmed. Thus, if the ready to run queue is empty, then processing passes through junction 56 to instruction 58, "Return To Yielded Context," thereby making an immediate return to the yielding context.

If the ready to run queue contains one or more control contexts, then the scheduling algorithm(s) is(are) employed to determine priority between the control context at the head of the associated ready to run queue and the yielding control context, 50 "Employ Scheduling Algorithms." Again, the scheduling algorithm(s) is(are) employed from within the yielding control context, for example, through a subroutine call. If the yielding control context still has priority, 52 "Yielded Context Have Priority?", then return is made to the yielding control context at instruction 58 "Return To Yielded Context," via junction 56. Conversely, if a new control context has priority then the context switcher is invoked to move the processing node to this priority control context, 54 "Invoke Context Switcher."

Referring to FIG. 4b, when the executing control context is blocked waiting on an event, inquiry is made into whether the associated ready to run queue is empty, 60 "Is Ready To Run Queue Empty?" If "no", then the context switcher is invoked since it is desirable to execute an alternate context presently ready to run, 62 "Invoke Context Switcher." If the associated ready to run queue is empty, however, then the processing node idles, 66 "Idle Scheduling Algorithms," after which inquiry is again made into whether the associated ready to run queue is empty, 68 "Is Ready To Run Queue Empty?" If "yes", then the processor returns via junction 64 to an idle state to again wait a predefined period of time, 66 "Idle Scheduling Algorithms." Eventually, a control context will become ready to run and will be placed at the head of the ready to run queue. When this happens, it may be that the control context in the ready to run queue is the same control context as the one which blocked, 70 "Is Priority Context Same As Blocked Context?" If it is, then immediate return is made to that control context, 74 "Return To Context That Last Blocked." Otherwise, the context switcher is invoked to move the processing node to the control context which is ready to run, 72 "Invoke Context Switcher."

To again summarize, a novel technique for managing process scheduling among multiple control contexts within a data processing environment is presented. This technique involves dividing the process scheduling function into separate portions. First, an evaluation function from within the processing control context is employed to determine whether a context switch is warranted. Secondly, if a context switch is warranted, then a context switcher is called to save the state of the descheduling control context, and restore the state of the priority control context. This second function may be executed either in the descheduling context or as a privileged context. The management technique is most useful in a situation where a single computer node is consumed by a single program which provides nonpreemptive process scheduling. The scheduling mechanism is useful in any situation where it is likely that redundant context switches will be invoked, thereby resulting in performance overhead. The concepts can be readily extended to preemptive process scheduling.

Although specific embodiments of the present invention have been illustrated in the accompanying drawings and described in the foregoing detailed description, it will be understood that the invention is not limited to the particular embodiments described herein, but is capable of numerous rearrangements, modifications and substitutions without departing from the scope of the invention. The following claims are intended to encompass all such modifications.

We claim:

1. A method for managing scheduling of execution among at least two control contexts within each of at least a portion of processing nodes of a parallel data processing system having multiple processing nodes, said method comprising the steps of:

(a) executing in a first processing node of the portion of processing nodes of said data processing system within a given control context comprising one of said at least two control contexts of the first processing node;

(b) upon processing of a scheduling event in said first processing node, evaluating control context execution scheduling priority while executing within said given control context, said executing being directly dependent on said given control context, said evaluating including using control context execution scheduling data or code, said control context execution scheduling data or code being accessible while executing from within any of said at least two control contexts and being determinative of control context execution scheduling priority among the at least two control contexts at the first processing node of the portion of processing nodes within said data processing system; and (c) restarting executing in said first processing node within a restart control context comprising one of said at least two control contexts, said restart control context being determined by said control context execution scheduling evaluating step (b).

2. The method of claim 1, wherein said method is employed within a non-preemptive scheduling data processing system, and wherein said restarting step (c) includes restarting executing within said given control context.

3. The method of claim 1, wherein said evaluating of said step (b) includes calling from said data processing system a predetermined scheduling code executable from within said given control context.

4. The method of claim 1, further comprising the step of context switching from said given control context to a different control context subsequent to said evaluating step (b) such that said different control context comprises said restart control context of said restarting step (c), said different control context comprising one of said at least two control contexts.

5. The method of claim 4, wherein said context switching includes the steps of:

descheduling said given control context wherein a state of said given control context is saved in said data processing system; and restoring said different control context having priority pursuant to said evaluating step (b).

6. The method of claim 1, further comprising the step of repeating steps (a)–(c) for each of a plurality of scheduling events.

7. A method for managing scheduling of execution of at least two control contexts within each of at least a portion of processing nodes of a parallel data processing system having multiple processing nodes, wherein a given control context is executing in a first processing node of the portion of processing nodes of said data processing system, said given control context comprising one of said at least two control contexts, said method comprising the steps of:

(a) processing a scheduling event in said first processing node;

(b) evaluating control context execution scheduling priority while executing within said given control context to determine a restart control context, said restart control context comprising one of said at least two control contexts, said executing being directly dependent on said given control context, said evaluating including using control context execution scheduling data or code, said control context execution scheduling data or code being accessible while executing from within any of said at least two control contexts and being determinative of control context execution scheduling priority among the at least two control contexts at the first processing node of the portion of processing nodes within said data processing system; and (c) restarting executing in said first processing node within said restart control context in response to said control context execution scheduling evaluating step (b).

8. The method of claim 7, wherein said method is employed within a non-preemptive scheduling data processing system and wherein said restart control context comprises said given control context such that said restarting step (c) includes restarting executing within said given control context in response to said control context scheduling evaluating step (b).

9. The method of claim 7, further comprising the step of context switching from said given control context to said restart control context subsequent to said evaluating step (b), said restart control context comprising a different one of said at least two control contexts from said given control context, said restart control context having a scheduling priority over said given control context as determined by said evaluating step (b).

10. The method of claim 9, wherein said context switching includes the steps of:

descheduling said given control context wherein a state of said given control context is saved in said data processing system; and restoring said restart control context having priority pursuant to said evaluating step (b).

11. At each of at least a portion of processing nodes of a parallel data processing system having multiple processing nodes, a system for managing scheduling of execution of a plurality of control contexts at each respective node wherein a given control context is executing, said given control context comprising one of said plurality of control contexts, said managing system comprising:

means for processing a context scheduling event at a first processing node of the portion of processing nodes;

means, responsive to said context scheduling processing means, for evaluating control context execution scheduling in said first processing node while executing within said given control context to identify a restart control context, said restart control context comprising one of said plurality of control contexts and having scheduling priority over all other of said plurality of control contexts, said executing being directly dependent on said given control context, said evaluating means including means for using control context execution scheduling data or code, said control context execution scheduling data or code being accessible while executing from within any one of said plurality of control contexts and being determinative of control context execution scheduling priority among the plurality of control contexts at the first processing node of the portion of processing nodes within said data processing system; and means for restarting execution at the first processing node of the portion of processing nodes within said restart control context in response to said control context execution scheduling evaluating means identifying a restart control context.

12. The managing system of claim 11, further comprising a context switcher for switching from said given control context to said restart control context subsequent to said evaluating means determining that said restart control context comprises a different one of said plurality of control contexts than said given control context.

13. The managing system of claim 12, wherein said context switcher includes:

means for descheduling said given control context including means for saving a state of said given control context; and means for restoring said restart control context in said data processing system.

14. The method of claim 1, wherein said method is employed within a non-preemptive scheduling environment and wherein said scheduling event comprises a voluntary yield while executing within said given control context.

15. The method of claim 7, wherein said method is employed within a non-preemptive scheduling environment and wherein said scheduling event comprises a voluntary yield while executing within said given control context.

16. The data processing system of claim 11, wherein said system employs non-preemptive scheduling and wherein said scheduling event comprises a voluntary yield while executing within said given control context.

* * * * *